July 7, 1959  K. MÜLLER  2,893,360
INTERNAL COMBUSTION ENGINE
Filed Oct. 23, 1957
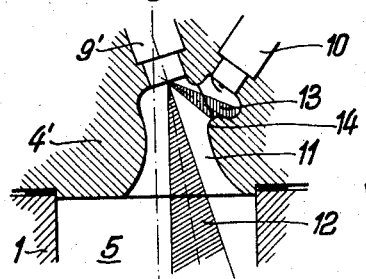
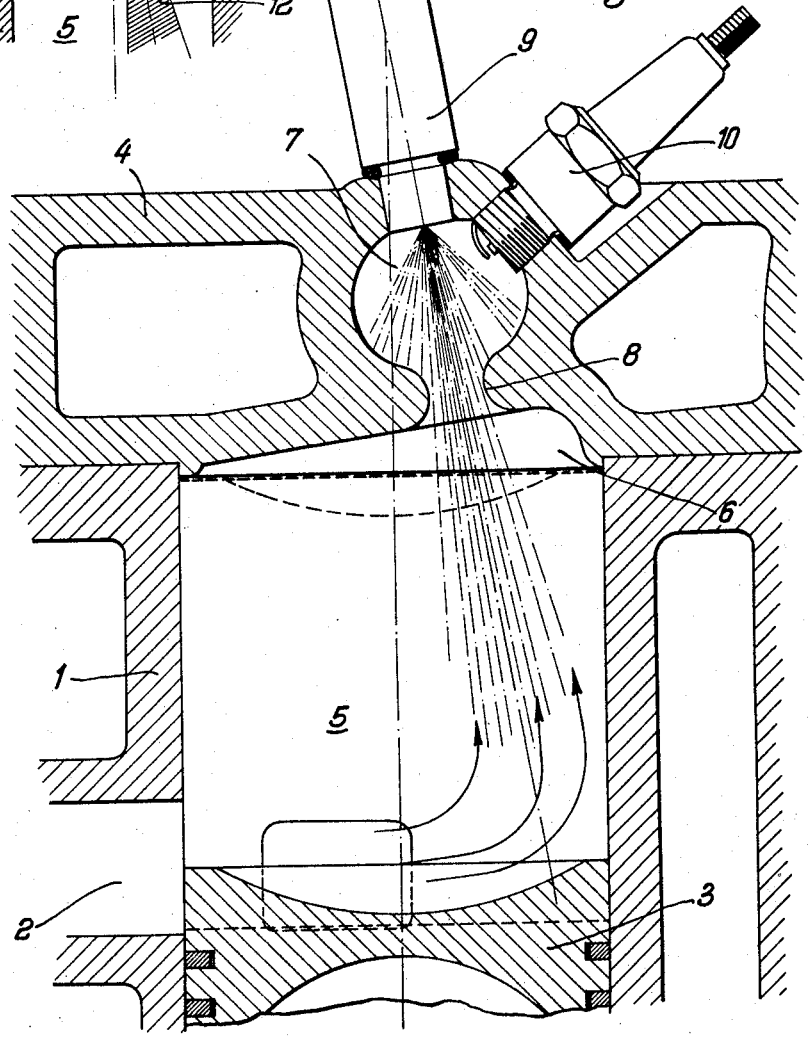
Inventor:
Klaus Müller
By Ernest G. Montague
Attorney United States Patent Office
2,893,360
Patented July 7, 1959

2,893,360

INTERNAL COMBUSTION ENGINE

Klaus Müller, Bad Nenndorf, Germany

Application October 23, 1957, Serial No. 691,892

4 Claims. (Cl. 123—32)

The present invention relates to a two-stroke cycle internal combustion engine with gasoline injection and reverse scavenging especially by means of a blower.

In order to improve the control conditions of a two-stroke cycle internal combustion engine having external ignition, it has already been proposed to provide, separate from the main combustion chamber, an auxiliary combustion chamber which accommodates a spark plug and an injection nozzle injecting the fuel into the main chamber. This arrangement, however, results in an insufficient output. On the other hand, it has been proposed for uniflow-scavenged engines, to collect the fuel which drips off the nozzle, in the combustion chamber separate from the main combustion chamber in order to control the engine without changing the volume of the scavenging air. These arrangements, however, have the disadvantage of an unfavorable construction since an additional valve has to be arranged in the cylinder head which houses the separate combustion chamber in uniflow-scavenged engines.

When using the conventional dome-shaped combustion chamber, combustion is controlled in that a suitable volume of scavenging air is supplied, for instance with the aid of a pneumatic governor, for an injected amount of fuel. This again resulted in that smooth operation was possible under a certain load only. Imperfect scavenging as a result of throttling the scavenging air supply as well as insufficient production of the fuel/air mixture resulted in misfiring and low efficiency.

It is one object of the present invention to eliminate the disadvantages of the known constructions in that the combustion is controlled solely through means of the fuel amount. The number of construction elements necessary for the control of combustion is reduced to a minimum and misfiring is eliminated under all load conditions.

It is another object of the present invention to provide an internal combustion engine, in which the position of the nozzle, the form of the jet and the size of the combustion chamber and the overflow opening between the two parts of the combustion chamber are selected so that under all loads and speeds the mixture is enriched in front of the spark plug. Preferably, the auxiliary combustion chamber is dimensioned so that its volume corresponds to the volume of the mixture when the engine is idling, and arranged so that the axis of the fuel jet is inclined towards the upward flow of scavenging air, a method used before, and that furthermore a projection is formed between the main and auxiliary combustion chamber through means of which part of the injected amount of fuel is retained near the spark plug under all load conditions to form an ignitable mixture in the auxiliary combustion chamber.

It is still another object of the present invention to provide an internal combustion engine, wherein a multi-hole nozzle is used, the main jet of which is directed towards the ascending flow of scavenging air through the main combustion chamber, and at least one of the branch jets is injected into the auxiliary chamber. However, a conventional pivot nozzle or flat bottom nozzle may be used, where a central fuel cone is surrounded by a jacket-like spray of fuel, beginning at the nozzle end.

Various different embodiments in accordance with this invention are possible.

With these and other objects in view which will become apparent in the following detailed description, the present invention will be clearly understood in connection with the accompanying drawing, in which:

Figure 1 is an axial section through a blower-scavenged two stroke cycle internal combustion engine in accordance with the present invention; and Fig. 2 is a diagrammatic view of another embodiment having a multi-hole nozzle in the auxiliary combustion chamber.

Referring now to the drawing and in particular to Fig. 1, the cylinder 1 with a piston 3 reciprocating therein and outlet ports 2 has a cylinder head 4 mounted on its top. Above the inside 5 of the cylinder 1, the cylinder head 4 is provided with a recess 6 which opens into a separate combustion chamber 7. This combustion chamber 7 has a narrowed-down portion adjacent the recess 6 so that an opening 8 of smaller diameter than that of the combustion chamber, is formed.

In the embodiment according to Fig. 1, an injection nozzle 9, preferably a flat-bottom nozzle is arranged in the combustion chamber 7, and a spark plug 10 fitted near the nozzle. The injection nozzle 9 is inclined relative to the axis of the cylinder so that the jet is directed towards the flow of air ascending in the cylinder chamber 5, as indicated by arrows. The separate combustion chamber 7 is dimensioned so that its volume corresponds to the volume of the mixture when the engine is idling.

As can be seen from the drawing, the jet of the injection nozzle 9 is formed so that part of the fuel amount is sprayed on the narrowed-down portion 8 so that immediately in front of the spark plug 10 the mixture is enriched. The center part of the fuel spray is injected into the ascending flow of air through the opening 8.

As can also be seen from the drawing, the combustion chamber 7 together with the injection nozzle 9 is inclined so that the axis of the jet passes through the opening 8.

In the embodiment as shown in Fig. 2, a combustion chamber 11 is formed in the cylinder head 4', housing the spark plug 10 and the injection nozzle 9'. Preferably, a multi-hole nozzle is used in this arrangement which produces a main jet 12 and a side spray 13. The main jet 12 is injected into the main combustion chamber, whilst the side spray 13 is directed onto a projection 14 in the combustion chamber 11 where the mixture is thus enriched in front of the spark plug 10. The nozzle holes are dimensioned so that when a smaller amount of fuel is injected, the quantitative relationship between the main jet and the side spray is in favor of the side spray.

In this case, too, it is ensured that the mixture is enriched in front of the spark plug so that under all speed and load conditions an ignitable mixture is in front of the spark plug to ignite the mixture in any case independent from the volume of air.

While I have disclosed two embodiments of the present invention, it is to be understood that these embodiments are given by example only and not in a limiting sense, the scope of the present invention being determined by the objects and the claims.

I claim:

1. A two-stroke cycle internal combustion engine with gasoline injection and scavenging in a direction opposite to that of said injection comprising a main combustion chamber and an auxiliary combustion chamber, a spark plug and an injection nozzle fitted in said auxiliary combustion chamber, means providing a flow ascending scavenging air in said main combustion chamber, said auxiliary combustion chamber communicating with said main combustion chamber through a channel of a smaller diameter than that of said auxiliary combustion chamber, said injection nozzle injecting the fuel into said main combustion chamber, and said auxiliary combustion chamber being dimensioned so that its volume corresponds to the volume of the mixture required for the idling engine, the longitudinal axis of said injection nozzle being inclined towards the longitudinal axis of said main combustion chamber so that the axis of the jet of fuel injected is inclined towards said ascending flow of scavenging air, and a portion of the amount of fuel injected being retained by said auxiliary combustion chamber adjacent said spark plug to form an ignitable mixture in said auxiliary combustion chamber under all load conditions.

2. The two-stroke cycle internal combustion engine, as set forth in claim 1, wherein said injection nozzle comprises a multi-hole injection nozzle injecting the main jet towards said ascending flow of scavenging air through said auxiliary combustion chamber into said main combustion chamber, and at least one of the side sprays emerging from said injection nozzle being directed towards the inside wall of said auxiliary combustion chamber.

3. The two-stroke cycle internal combustion engine, as set forth in claim 2, wherein the holes of said multi-hole injection nozzle are dimensioned so that when a smaller amount of fuel is injected, the quantitative relationship between said main jet and said side sprays are in favor of said side sprays.

4. A two-stroke cycle internal combustion engine with gasoline injection and scavenging in a direction opposite to that of said injection comprising a main combustion chamber and an auxiliary combustion chamber, a spark plug and an injection nozzle fitted in said auxiliary combustion chamber, means providing a flow ascending scavenging air in said main combustion chamber, said auxiliary combustion chamber communicating with said main combustion chamber through a channel of a smaller diameter than that of said auxiliary combustion chamber, said injection nozzle injecting the fuel into said main combustion chamber, and said auxiliary combustion chamber being dimensioned so that its volume corresponds to the volume of the mixture required for the idling engine, the longitudinal axis of said injection nozzle being inclined towards the longitudinal axis of said main combustion chamber so that the axis of the jet of fuel injected is inclined towards said ascending flow of scavenging air, and a portion of the amount of fuel injected being retained by said auxiliary combustion chamber adjacent said spark plug to form an ignitable mixture in said auxiliary combustion chamber under all load conditions, and said injection nozzle comprising a flat-bottom injection nozzle producing a central cone of fuel surrounded by a jacket-like spray beginning at the nozzle end.

References Cited in the file of this patent

UNITED STATES PATENTS 2,758,576     Schlamann  ------------ Aug. 14, 1956

FOREIGN PATENTS 414,100     Italy  ------------------ June 27, 1946